US007451435B2

(12) United States Patent
Hunt et al.

(10) Patent No.: US 7,451,435 B2
(45) Date of Patent: Nov. 11, 2008

(54) SELF-DESCRIBING ARTIFACTS AND APPLICATION ABSTRACTIONS

(75) Inventors: Galen C. Hunt, Bellevue, WA (US); Thomas Roeder, Ithaca, NY (US); James R. Larus, Mercer Island, WA (US); Manuel Fahndrich, Seattle, WA (US); John D. DeTreville, Seattle, WA (US); Steven P. Levi, Redmond, WA (US); Benjamin Zorn, Woodinville, WA (US); Wolfgang Grieskamp, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 518 days.

(21) Appl. No.: 11/007,808

(22) Filed: Dec. 7, 2004

(65) Prior Publication Data

US 2006/0123412 A1    Jun. 8, 2006

(51) Int. Cl.
*G06F 9/44* (2006.01)
(52) U.S. Cl. ............ 717/120; 717/117; 717/121; 717/122; 717/126; 717/174
(58) Field of Classification Search ............. 717/117, 717/120–126, 174–178
See application file for complete search history.

(56) References Cited

U.S. PATENT DOCUMENTS

| | | | |
|---|---|---|---|
| 4,916,637 A | 4/1990 | Allen et al. | |
| 5,481,717 A * | 1/1996 | Gaboury | 717/126 |
| 5,590,001 A | 12/1996 | Ino et al. | |
| 5,752,032 A | 5/1998 | Keller et al. | |
| 5,768,532 A * | 6/1998 | Megerian | 709/245 |
| 5,794,052 A | 8/1998 | Harding | |
| 5,857,195 A * | 1/1999 | Hayashi et al. | 707/102 |
| 5,878,408 A | 3/1999 | Van Huben et al. | |
| 5,963,743 A | 10/1999 | Amberg et al. | |
| 5,974,572 A | 10/1999 | Weinberg et al. | |
| 5,991,518 A | 11/1999 | Jardine et al. | |
| 6,009,476 A | 12/1999 | Flory et al. | |
| 6,038,399 A | 3/2000 | Fisher et al. | |
| 6,066,182 A | 5/2000 | Wilde et al. | |

(Continued)

FOREIGN PATENT DOCUMENTS

EP        1443398 A        8/2004

(Continued)

OTHER PUBLICATIONS

Watson, et al., "Design and implementation of the Trusted BSD MAC framework", Proceedings of 2003 DARPA Information Survivability Conference and Exposition, Sec. 1&5-7, Apr. 2003, pp. 38-49.

(Continued)

*Primary Examiner*—Wei Y. Zhen
*Assistant Examiner*—Matthew J Brophy
(74) *Attorney, Agent, or Firm*—Lee & Hayes, PLLC

(57) ABSTRACT

Described herein is at least one implementation employing multiple self-describing software artifacts persisted on one or more computer-storage media of a software-based computer. In this implementation, each artifact is representative of at least part of the software components (e.g., load modules, processes, applications, and operating system components) of the computing system and each artifact is described by at least one associated "manifest," which include metadata declarative descriptions of the associated artifact.

41 Claims, 7 Drawing Sheets

U.S. PATENT DOCUMENTS

| | | | |
|---|---|---|---|
| 6,080,207 A | 6/2000 | Kroening et al. | |
| 6,092,189 A | 7/2000 | Fisher et al. | |
| 6,144,992 A | 11/2000 | Turpin et al. | |
| 6,157,928 A | 12/2000 | Sprenger et al. | |
| 6,161,051 A | 12/2000 | Hafemann et al. | |
| 6,182,275 B1 | 1/2001 | Beelitz et al. | |
| 6,247,128 B1* | 6/2001 | Fisher et al. | 713/100 |
| 6,292,941 B1 | 9/2001 | Jollands | |
| 6,351,850 B1 | 2/2002 | van Gilluwe et al. | |
| 6,381,742 B2* | 4/2002 | Forbes et al. | 717/176 |
| 6,405,361 B1* | 6/2002 | Broy et al. | 717/104 |
| 6,442,754 B1 | 8/2002 | Curtis | |
| 6,446,260 B1 | 9/2002 | Wilde et al. | |
| 6,487,723 B1 | 11/2002 | MacInnis | |
| 6,816,905 B1 | 11/2004 | Sheets et al. | |
| 6,842,782 B1 | 1/2005 | Malik et al. | |
| 6,868,539 B1* | 3/2005 | Travison et al. | 717/100 |
| 7,062,764 B2* | 6/2006 | Cohen et al. | 717/171 |
| 7,155,713 B1* | 12/2006 | Burkhardt et al. | 717/175 |
| 7,167,867 B1* | 1/2007 | Rago | 707/101 |
| 7,222,106 B2* | 5/2007 | Block et al. | 705/59 |
| 7,222,341 B2* | 5/2007 | Forbes et al. | 717/170 |
| 2001/0029605 A1* | 10/2001 | Forbes et al. | 717/11 |
| 2002/0099954 A1 | 7/2002 | Kedrna et al. | |
| 2002/0100017 A1* | 7/2002 | Grier et al. | 717/120 |
| 2003/0031404 A1 | 2/2003 | Pedersen | |
| 2003/0061404 A1 | 3/2003 | Atwal et al. | |
| 2003/0130854 A1* | 7/2003 | Galanes et al. | 704/277 |
| 2003/0212990 A1* | 11/2003 | Brodkorb et al. | 717/174 |
| 2003/0233644 A1* | 12/2003 | Cohen et al. | 717/171 |
| 2004/0034850 A1* | 2/2004 | Burkhardt et al. | 717/120 |
| 2004/0061067 A1 | 4/2004 | Clauss | |
| 2004/0064736 A1* | 4/2004 | Obrecht et al. | 713/201 |
| 2004/0123273 A1* | 6/2004 | Hammerich et al. | 717/126 |
| 2004/0187096 A1* | 9/2004 | Dumont | 717/120 |
| 2004/0236861 A1 | 11/2004 | Bondar et al. | |
| 2004/0268361 A1* | 12/2004 | Schaefer | 719/310 |
| 2005/0005261 A1* | 1/2005 | Severin | 717/108 |
| 2005/0021537 A1* | 1/2005 | Brendle et al. | 707/100 |
| 2005/0050069 A1* | 3/2005 | Vaschillo et al. | 707/100 |
| 2005/0060687 A1* | 3/2005 | Ghazaleh et al. | 717/123 |
| 2005/0091658 A1* | 4/2005 | Kavalam et al. | 718/104 |
| 2006/0031815 A1* | 2/2006 | Bhagia et al. | 717/106 |

FOREIGN PATENT DOCUMENTS

| | | |
|---|---|---|
| KR | 10-1992-0013166 A | 7/1992 |
| KR | 20010007119 | 1/2001 |
| WO | WO02093370 A | 11/2002 |
| WO | WO03038599 A2 | 5/2003 |

OTHER PUBLICATIONS

Pike, et al., "Plan 9 from Bell Labs".

Pike, et al, "The Use of Name Spaces in Plan 9", Operating Systems Review, vol. 27, #2, Apr. 1993, pp. 72-76.

"Trademark Electronic Search System (TESS) from the USPTO database" for "Windows" trademark of Microsoft filed in USPTO Aug. 20, 1999; http://tess2.uspto.gov/bin/gate.exe? f=doc &state=n00gan.5.26.

Microsoft Press Computer Dictionary, Second Edition, 1994, Published by Penguin Books, Ltd., pp. 23-24 and p. 279.

Microsoft Press Computer Dictionary Third Edition: 1997 3 pages.

"The JX Operating System" Michael Golm, Meik Felser Christian Wawersich, and Juergen Kleinoeder 2002 USENIX Annual Technical Conference, Jun. 10-15, 2002, Monterey, CA, pp. 45-58.

* cited by examiner

SELF-DESCRIBING ARTIFACTS AND APPLICATION ABSTRACTIONS

TECHNICAL FIELD

This invention generally relates to a technology for managing the software components of one or more computer systems.

BACKGROUND

The reliable installation, configuration, maintenance, and removal of components of a conventional software-based computer have long been a difficult problem. Examples of such components include the following: operating systems (OSs), application programs, device drivers, application programming interfaces, and other systems programs. Examples of conventional software-based computers include the typical general-purpose personal computers (PC) running one of the many existing OSs.

A software-based computer is typically embodied by the persistent contents and configuration of its secondary computer-storage system (e.g., a "hard disk"). The conventional computer-embodying content and configuration is merely a collection of bits accumulated over time and without centralized oversight and coordination. Typically, these accumulated bits are the result of a series of individual ad hoc events throughout the lifetime of the computer. Examples of changes include, for example, installation of a program, change of a configuration setting in a registry key, deletion of a file, or installation of a software patch.

When a software-based computer boots, it merely executes whatever the computer finds on hard disk. Since the correctness of the contents on the computer's disk ultimately depends on the correctness of each of these ad hoc events over the lifetime of the computer, the contents and configuration of the computer may readily become corrupted, damaged, skewed, obsolete, or simply incorrect.

The correctness of the computer's contents and configuration is further threatened by other externally initiated ad hoc event involving a malicious attack by a virus, a worm, spyware, and the like. Unbeknownst to the user of the software-based computer, these malicious attacks alter the computer's contents and configuration, most likely in a manner that is inconsistent with the user's desires.

Various products and services (e.g., so-called "anti-virus" and "disk cleanup" utilities) are available for detecting and correcting a computer's contents and configuration that have become corrupted, damaged, skewed, and/or attacked. While clearly well intentioned, these products and services may just compound the problem by introducing yet another ad hoc event to the resulting accumulation of bits on the computer's disk.

Conventional software-based computers are inherently brittle. One reason is because the computer's collection of accumulated bits has incomplete descriptions that are, at best, anecdotal. These incomplete descriptions are merely the results of the same series of ad hoc events and do not systematically describe the bits on the disk or the series of events that produced them. They are also unmatched with any specification, total or partial, of what the system configuration should be, or of any way of checking the state against the specification.

The following fact illustrates the inadequacies of conventional software-based computers: Given an arbitrary offline "system image," one cannot in general determine conclusively that the system image contains a functional OS or a specific functional application. A system image is a bit-for-bit copy of the contents and configuration information typically persisted on a hard disk of a conventional software-based computer. Those contents and configuration, as discussed above, embody the computer.

Given a system image, one may check if specific files exist on the image. This check may be done with empirical knowledge of which specific files are installed with a particular OS or particular application. However, such empirical evidence does not tell one whether all of the necessary components (of the particular OS or particular application) are installed. Such empirical evidence does not tell one whether there are any conflicting components are installed. Further, such empirical evidence does not tell one whether all of the components (of the particular OS or particular application) are configured correctly to produce a functional computer. Such checks are necessary but not sufficient.

Even if one empirically determines the existence of all of the specific files necessary for a particular OS or application to function, that fact is not sufficient for one to know that particular OS or application on the image will function correctly. Again, these checks are necessary but not sufficient.

Indeed, the only effective conventional recourse is to abandon the offline examination of the image and implement an online examination. One may boot a computer using the system image and observe the results. This conventional approach is often impractical, unsatisfactory, and unsafe. Clearly, this approach is not scalable.

Even using the conventional approach of an online examination, it is often difficult to identify, without doubt, which particular applications and/or OS components are installed or even currently running. Often all that one has determined is that an application or component having a specific name exists on the computer. This determination relies on the software developers avoiding the use of misleading names. Such misleading names may occur inadvertently or purposefully.

For example, while existing OSs available in the marketplace (like Windows® XP or Linux) might show a list of running processes, by name of the file used to start the process, the name of each running process is only a "hint" as to true identity of the process. For example, an innocuously named process might have been hijacked by a virus and subverted to another potentially malevolent task. Alternatively, a properly named process may have been corrupted by, for example, an administrator installing a seemingly unrelated application.

With conventional software-based computers, there is no descriptive structural link between low-level software abstractions and high-level software abstractions. This means that there is nothing in the structure or architecture of the conventional software-based computers that descriptively and necessarily links low-level and high-level software abstractions.

Low-level software abstractions include, for example, particular files (e.g., load modules) on a disk and particular processes executing on the computer. High-level software abstractions include, for example, applications programs (e.g., Microsoft® Publisher® desktop publishing product) and families of applications (e.g., Microsoft® Office® suite of office productivity products).

For example, the concept of an application program is part of a user-centric model. Where a user sees an application program (or group of programs) that helps the user accomplish a specific task (e.g., word processing, spreadsheet analysis, and database management), a conventional software-based computer merely sees one or more active processes. There is nothing inherent in the architecture of the conventional software-based computers that descriptively and necessarily links the active processes (and their load model sources) with the representation of the application program that the user sees (typically via a graphic user-interface (GUI) process).

SUMMARY

Described herein is at least one implementation employing multiple self-describing software artifacts persisted on one or more computer-storage media of a software-based computer. In this implementation, each artifact is representative of at least part of the software components (e.g., load modules, processes, applications, and operating system components) of the computing system and each artifact is described by at least one associated "manifest," which include metadata declarative descriptions of the associated artifact.

BRIEF DESCRIPTION OF THE DRAWINGS

The same numbers are used throughout the drawings to reference like elements and features.

DETAILED DESCRIPTION

The following description sets forth techniques implementing a computing technology for a software-based computer employing self-describing software artifacts. An exemplary implementation of these techniques may be referred to as an "exemplary self-describing artifact architecture."

The exemplary self-describing artifact architecture provides a refreshing and invigorating approach to the realm of computer science. Rather than being no more than an accumulation of bits resulting from series of ad hoc events during the lifetime of a software-based computer, the contents and configuration of the computer utilizing this new architecture is an organized, stable, reliable, robust, and deterministically constructible collection of self-defining software artifacts.

Before describing the new architecture, a brief introductions of terminology is appropriate. The following terms, as used herein, are briefly defined here. However, the reader is encourage the read the full text to understand and appreciate the full meaning of each term in the context of the full description.

Software Artifact (or simply "artifact") is an offline manifestation of an executable entity (e.g., a process, an application, a component of the operating system); it includes, for example, load modules and configuration files.

Manifest is metadata declarative description of an executable entity. A manifest may be associated with each manifestation of an executable entity. Manifest may be static or dyamic.

Prototype is an executable (or "runable") manifestation of an executable entity, but a prototype of an entity is not in an executing state.

Abstraction is a manifestation of an executable entity when it is in an executing state ("it is running").

Component is a part, portion, or constituent element of a manifestation of an executable entity; For example, an application includes process components and a process includes executable instructions as components.

Exemplary Self-Describing Artifact Architecture

Figure 1:
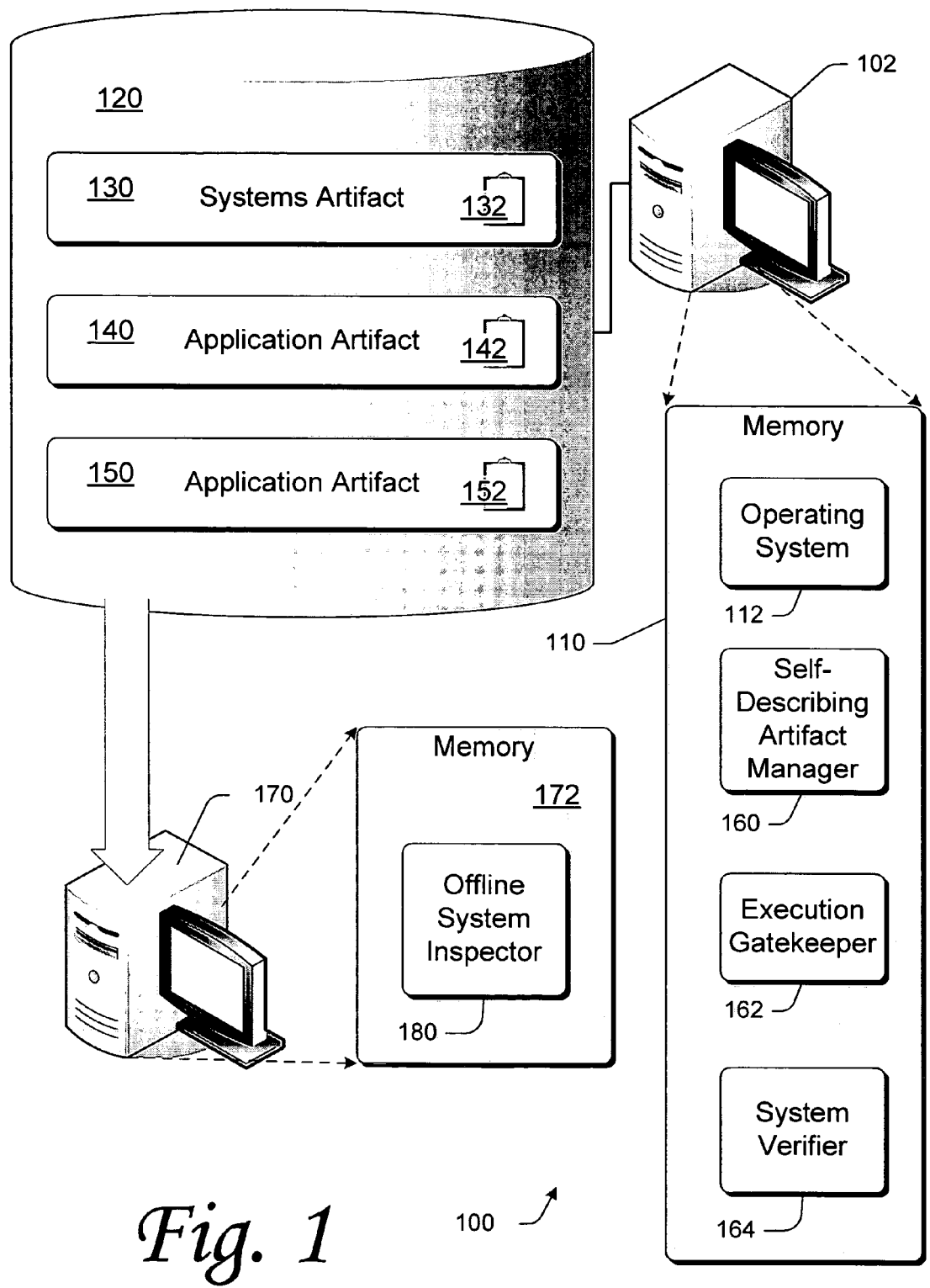
FIG. 1 shows an example operating scenario for an implementation described herein.

FIG. 1 illustrates one view of an exemplary self-describing artifact architecture 100. In this view, the architecture 100 is implemented on a software-based computer 102, which is configured with a memory 110 (e.g., volatile, non-volatile, removable, non-removable, etc.). The computer 102 has an operating system (OS) 112, which is active in the memory 110.

The computer 102 has access to at least one computer-storage device 120 (e.g., a "hard disk"). The computer-storage device 120 contains the contents and configuration that embody the computer 102. The contents include various software components, which include (by way of example and not limitation) an operating system (OS), the OS elements, all installed applications, and all other associated components (e.g., device drivers, installation files, data, load modules, etc.). The configuration includes the specified properties of each software component and the defined interrelationship amongst the components.

For the purposes of this discussion, references to the "system" represents the software-based computer 102 as it is embodied by the contents and configuration of the storage device 120. A persisted offline (i.e., non-executing) copy of the system may be called, herein, a "system image."

FIG. 1 shows, for example, three artifacts (130, 140, and 150) stored on the storage device 120. Herein, "software artifacts" or simply "artifacts" are collections of individual software items stored on the computer-storage device 120. Portions of these items may be stored in various system stores including file systems, databases, configuration registries, etc. Those artifacts represent the system-embodying content and configuration. A computer's storage device may have a multitude of artifacts. A system image of a computer contains a multitude of artifacts.

Unlike a conventional software-based computer, the artifacts of the computer 102 are not merely an accumulation of bits resulting from series of ad hoc events during the lifetime of the computer. Rather, each of the artifacts of the computer 102 are associated with at least one manifest. For example, systems artifact 130 has its associated manifest 132 stored therewith the artifact or at some derivable or known-location on the storage device 120. Artifacts 140 and 150 have their associated manifests, 142 and 152 respectively.

These artifacts are called "self-describing artifacts" because each of the artifacts (via its associated manifest of metadata) describes itself. Rather than being procedural (e.g., a list of actions to be performed), the self-describing metadata descriptions are a declarative description of the desired state of the artifact.

Each description is a complete prescriptive record of the state necessary for the artifact to be consistent and correct. By analogy while a set of directions is procedural, a precise address is declarative and more powerful in the sense that it allows new computation; for example, one can use the address to determine a new set of directions for a different starting point. The declarative description includes a record of all of the artifact's interdependencies and interrelationships with other components of the system.

These metadata descriptions effectively bridge low-level and high-level software abstractions. Low-level software abstractions include, for example, particular artifacts (e.g., load modules) on a storage device and particular processes executing on the computer. High-level software abstractions include, for example, running applications programs and families of applications. High-level software abstractions may also include the running operating system (such as OS 112) and its elements.

As depicted in FIG. 1, the computer 102 has, in the memory 110, three oversight and managerial functional components that utilize the self-components describing property of the artifacts on the computer 102. Those functional include a self-describing artifact manager 160, an execution gatekeeper 162, and a systems verifier 164.

While each of these functional components are shown separately in FIG. 1, their functionality may be combined into fewer components or expanded to additional components. Furthermore, these functional components may be part of the computer's OS 112 or they may be part of a non-OS component of the computer 102.

The self-describing artifact manager 160 manages the self-describing artifacts on the storage device 120. As part of that management, the manager may facilitate persistence and structuring of artifacts. The manager may ensure the maintenance of the association between each artifact and its manifest. The manager may ensure the consistency of an artifact to the description in its manifest. Furthermore, the manager may update self-describing artifacts in response to changes in configuration of the system.

The self-describing artifact manager 160 may assist in the optimization on the loading of artifacts from the storage device 120. The self-describing artifact manager may take a larger view of the overall operation of the applications and the OS of the computer. Based on this view, the self-describing artifact manager 160 may determine which artifacts (e.g., load modules) will be combined in processes for a particular application. The manager may then combine artifacts into a smaller, and presumably optimized, number of artifacts. Similarly, using the system manifest (which contains declarative descriptions of the entire system) to determine which applications will be invoked soon, the self-describing artifact manager can encourage the start of some applications before they are actually invoked.

The execution gateway 162 clears an application (and possibly other executable components) for invocation. When invocation of an application is pending, the execution gatekeeper 162 examines its associated self-describing artifacts. The declarative descriptions in the self-describing artifacts may specify explicit static or dynamic conditions that are required for the associated application. An example of typical explicit conditions is a list of necessary components, which must exist on the system for the successful execution of the application. Another example of typical explicit conditions is a list of applications and system components that must have been launched (or are in a specified current state) before an application itself is allowed to launch.

The gatekeeper examines the current conditions and if they meet the requirements specified in the declarative descriptions of the associated artifacts, then the gatekeeper allows invocation of the application. Otherwise, then the gatekeeper does not allow invocation of the application.

With the governance of the execution gatekeeper 162, no code will execute on the computer 102 unless the code is described in an associated manifest. In one embodiment, only code described in associated manifests and signed by trusted software publishers may be installed or run on the computer 102.

In addition, the execution gatekeeper 162 may perform audits on the integrity of the system as a check against external modification (e.g., by way of innocent data corruption or malicious attacks). The audit is based upon the manifests of the self-describing artifacts of the system.

The system verifier 164 performs one or more verifications on the self-describing artifacts. It may perform this in response to a manual request to do so, in response to an action (e.g., installation of new software), in reponse to new information becoming available, and/or as scheduled to do so. Furthermore, verifications made by the system verifier 164 are based, at least in part, upon information gathered from an examination of the manifests of the self-describing artifacts.

The system verifier 164 performs one or more of the following verifications:

that all dependencies of installed software in the computer 102 are met that an operating system of the computer 102 includes all device drivers necessary to run on the hardware configuration of the computer 102;

that code and configuration settings in the computer 102 have not been altered either accidentally or maliciously;

that an application is correctly installed in the computer 102;

that a known faulty or malicious program is not installed on the computer 102;

that an application and all of its constituent components and dependencies exist on the computer 102 before installation;

that an application is installable on the computer 102 before loading its components onto a system;

that installation of a new application or system component will not conflict with existing applications or components;

that an application or operating system component can be removed without breaking dependencies from other applications or components;

that an application or operating system conforms to a pre-defined local policy;

that the necessary pre-conditions for application launch are met before the application is launched;

that applications for which pre-conditions are not met are not allowed to execute;

that during execution, if necessary conditions for execution are no longer valid, the application is no longer allowed to execute.

As shown in FIG. 1, another computer 170 is configured with its own memory 172 (e.g., volatile, non-volatile, removable, non-removable, etc.). This memory has a system inspector 180 therein.

As represented by the large-headed arrow, the system inspector 180 receives, as input, the "system image" of the computer 102. In other words, it receives a copy of the system-embodying contents and configuration of the computer 102. It may be received directly from the computer 102 or indirectly as a separate copy of the "system image."

The system inspector 180 performs an analysis of the offline "system image" to verify conclusively that the computer 102 contains specific functional components (such as the OS or applications). More particularly, the inspector examines the self-describing artifacts to see if all of the necessary components (described as such and referenced by manifests of the self-describing artifacts) are located and properly identified. The inspector reports the results of this examination.

The information contained in the manifest for an artifact can be used by a compiler or other optimization tool to facilitate the optimization of the code in the artifact, at install time, program load time, or another time of a user's choosing, by describing all of the libraries, components, and dependencies of the artifact. This description permits the compiler or tool to make more precise assumptions about the environment in which the artifact executes and the code within the artifact.

The information contained in the manifest for an artifact can be used by an error detection tool to facilitate ensuring the correctness of the code in the artifact, at install time, program load time, or another time of a user's choosing, by describing all of the libraries, components, and dependencies of the artifact. This description permits the tool to make more precise assumptions about the environment in which the artifact executes and the code within the artifact.

Manifest

A manifest contains metadata that describes artifacts of the computer 102. The metadata also describes configuration information related to the artifacts including external dependencies and external interfaces. The manifests also describe the connectivity relationships between software components.

For example, the manifest for an application called "ProgramA", as delivered by its publisher, includes a list of the binary load modules (EXEs, DLLs, etc.), certificates attesting to the authenticity of the components and provider, a list of the names of configuration settings and their default values, a list of external binary load modules required by the program's load modules, a list of external settings and names accessed by the program, and a list of names and settings exposed by ProgramA, such as the information required to tell the operating system that ProgramA wants to be the default editor for files with the ".ZZZ" extension.

In at least one embodiment, the manifests of self-describing artifacts contain declarative descriptions that provide sufficient information to enable the following:

program-installation software to install or uninstall its program components without executing any ad-hoc code contained within the program;

the person or agent installing a program to bind its program components to other programs or resources;

the person or agent installing a program to override any configurable default settings;

the person or agent installing a program to make it part of the manifest for the system as a whole;

inspector software (e.g., system inspector 180) to verify that a particular program has been correctly installed or uninstalled, both in its own context and in the context of the system as a whole;

verification software (e.g., system verifier 164) to determine if a particular program is presently runnable;

pre-installation software to determine if all dependencies are met on a system necessary to enable a particular program to be installed and run;

the person or agent installing a particular program to determine other aspects of the future behavior of the program or of the system as a whole;

compiler or optimization tool to have a precise description of the code in the artificat and the environment in which it executes;

error-detect tool to have a precise description of the code in the artificat and the environment in which it executes;

The manifest need not contain all available metadata about a program or system, but it needs to provide sufficient information to enable reliably locating additional metadata. In one embodiment, for example, the binary load modules (EXE, DLLS, etc.) for a program contain metadata that references metadata associated with specific load modules. In this embodiment, the manifest informs the system of the existence of this additional metadata within the load modules.

In one embodiment, the manifest identifies the type of each subcomponent of the manifest. The subcomponent type identifies a piece of helper software, which knows how to interpret the contents of the subcomponent, extract additional metadata from the component, and derive additional metadata about the component.

For example, in one embodiment, load modules described in a manifest are expressed in an abstract instruction set that allows a verification tool to determine if they obey certain software properties, such as conformance to communication requirements. The manifest for the load modules identifies the exact abstract instruction set used for each load module so that the system verifier 164 can determine which helper software to load to verify specific system properties, such as the communication requirements.

In yet another aspect of an embodiment, the information used to determine compatibility among the parts of a system is delivered independently of the components, as well as along with them. This information can arrive from many sources, and a local administrator or agent can define or follow rules for disambiguating partial or contradictory information.

In yet another aspect of an embodiment, the information used to determine compatibility among the parts of a system changes over time, as new information becomes available at an appropriate location, or as old information is revoked.

Manifests may be combined into graphs to describe arbitrarily complex software systems. Manifests may refer to external manifests as dependencies. Manifests may also contain embedded manifests. In one embodiment, the manifest for an application contains or uses manifests for subcomponents of the application.

Depending on packaging decisions made by the publisher of the application, subcomponents can be either embedded in the manifest or referenced as external entities. In one embodiment, external dependencies include a name and version number of the dependency, or other clarifying information. In another embodiment, external dependencies are named through a signed digest. In another embodiment, this information can be updated, revoked, and clarified (i.e., disambiguated).

In one embodiment, the manifest for an application is packaged and delivered with its associated application. In another embodiment, the manifest for an application is packaged and delivered separately from its associated application. With this, the presumably multiple components of an application may be delivered separately and after delivery of its associated manifest.

In one embodiment, external manifests may also be referenced as sources of external information. These external manifests may be named individually, or they may be named as members of a group.

There are two forms of the manifests: static and dynamic. The static manifests are stored in association with software artifacts. The dynamic manifests are employed during the runtime of an executable component associated therewith. The dynamic manifest includes the static metadata (which is still available at runtime) and additional dynamic metadata that are constructed at runtime to connect runtime system elements, like processes and operating system objects.

This aspect further enables bridging from low-level implementation concepts to higher-level concepts. The self-describing feature of the software artifacts is useful on a running and active system and not just a static system. For example, the "well-formedness" and or consistency of a running system of processes can be verified similarly to the verification of the system image.

In one embodiment, "über" manifests describe all software available on the computer 102, directly or indirectly, and whether such software is installed or not.

Figure 2:
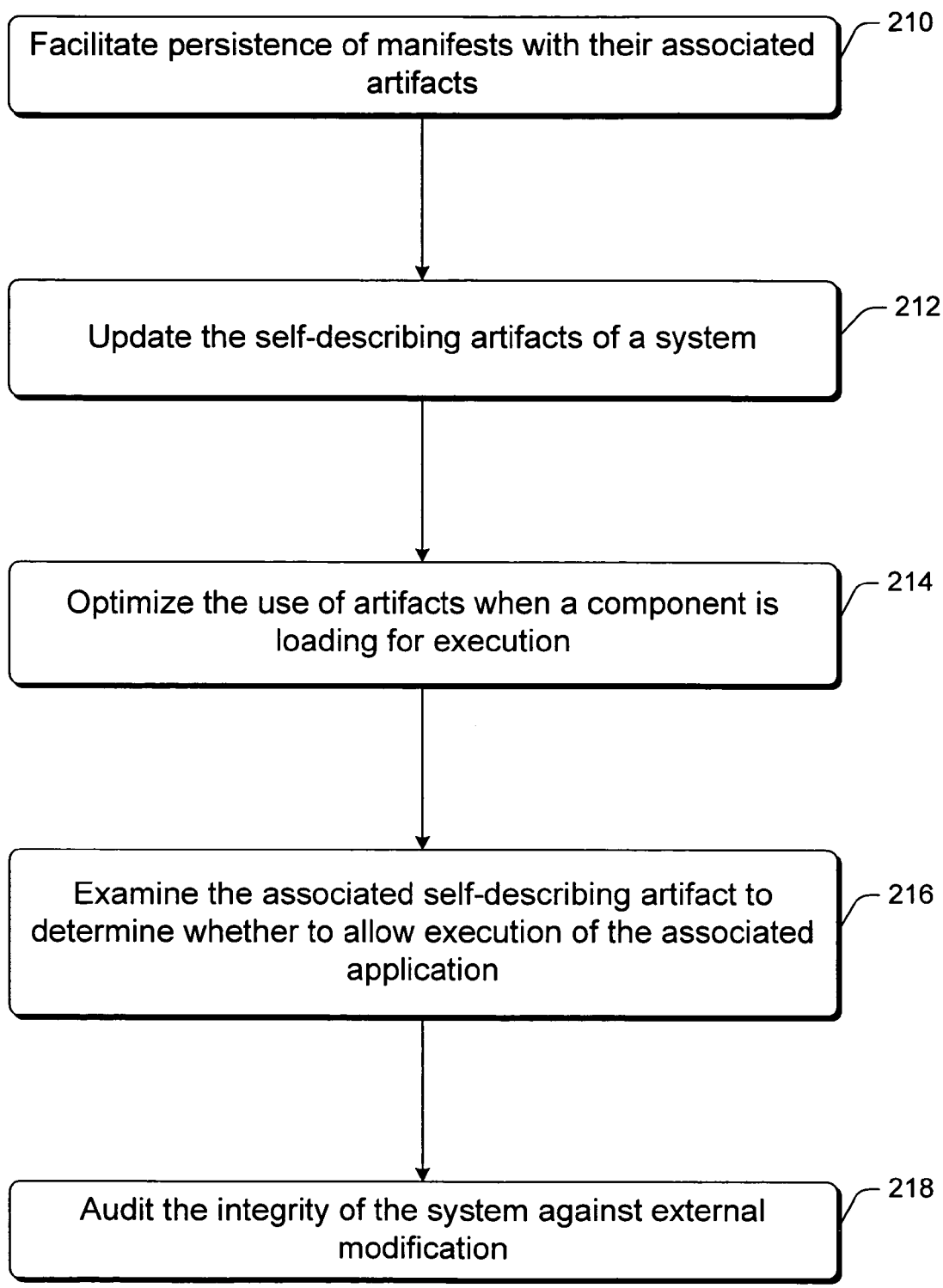
FIG. 2 shows a flow diagram showing one or more methodological implementations, described herein, for management of persisted self-describing artifacts and performing gatekeeping on execution of software components composed of, at least in part, of the self-describing artifacts.

Methodological Implementation of Exemplary Self-Describing Artifact Management and Gatekeeping FIG. 2 shows a method 200 performed by the self-describing artifact manager 160 and/or the execution gatekeeper 162. This methodological implementation may be performed in software, hardware, or a combination thereof. For ease of understanding, the method is delineated as separate steps represented as independent blocks in FIG. 2; however, these separately delineated steps should not be construed as necessarily order dependent in their performance. Additionally, for discussion purposes, the method 200 is described with reference to FIG. 1.

At 210 of FIG. 2, the self-describing artifact manager 160 facilitates persistence of manifests with their associated artifacts. As shown in of FIG. 1, manifest 132 is persisted in association with the systems artifact 130 or it is stored at some derivable or known-location on the storage device 120. Similarly, manifests 142 and 152 are stored in association with application artifacts 140 and 150.

At 212, the self-describing artifact manager 160 updates the self-describing artifacts of a system in accordance with the changes in the system's content and/or configuration. Such changes may be result of, for example, installation of new content, a manual configuration change, and automatic configuration change performed by the operating system. Before they are applied, updates may be checked in the context of the collection of system manifests to ensure that if applied they will result in a viable system.

At 214, the self-describing artifact manager 160 optimizes the use of artifacts for execution. The manager can determine which load modules will be combined in processes for an application. The manager can then combine load modules into a smaller number of load modules, which have been optimized together. Similarly, using the system manifest to determine which applications will be invoked soon, the self-describing artifact manager can encourage the start of some applications before they are actually invoked.

At 216, the execution gatekeeper 162 examines the associated self-describing artifacts to determine whether to allow execution of the associated application (or other program) based upon the current conditions and the declarative descriptions of the associated manifests. When such determination is made, the gatekeeper may limit or prevent execution of the associated application (or other program).

For example, local policy of a computer may precisely describe which applications can and cannot be invoked, as well as the manner in which they may be invoked. If so, the gatekeeper will only allow invocation in the specified manner.

At 218, the system verifier 164 audits the integrity of the system against external modification. The audit is based upon the manifests of the self-describing artifacts of the system. For example, a load module's manifest may contain a signed digest of the contents of the one or more associated load modules. The gatekeeper can periodically check the contents of all load modules to see if they still match their specified digests.

Methodological Implementation of Exemplary System Verification

Figure 3:
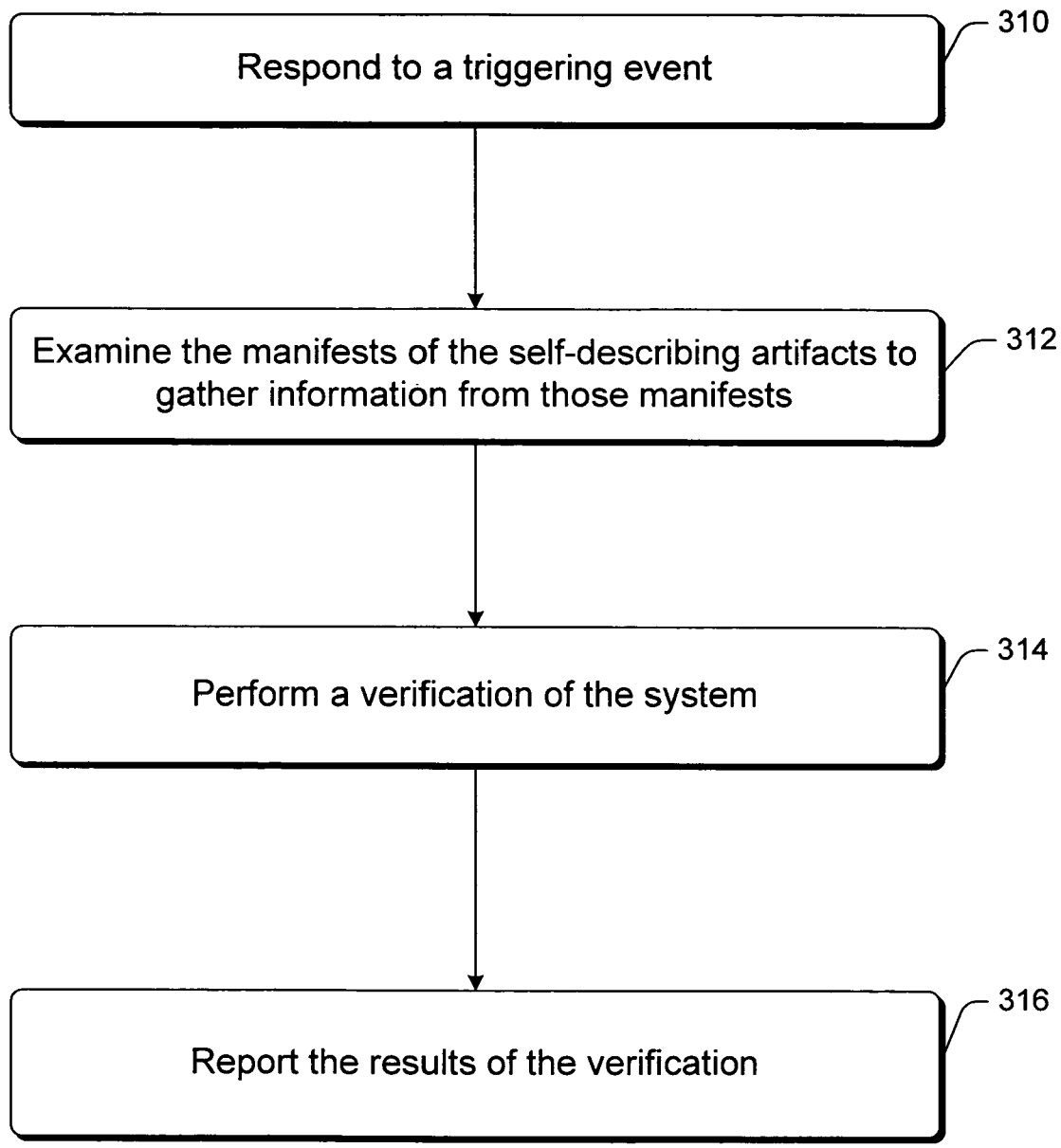
FIG. 3 shows a flow diagram showing a methodological implementation described herein to verify the persisted self-describing artifacts.

FIG. 3 shows a method 300 performed by the systems verifier 164. This methodological implementation may be performed in software, hardware, or a combination thereof. For ease of understanding, the method is delineated as separate steps represented as independent blocks in FIG. 3; however, these separately delineated steps should not be construed as necessarily order dependent in their performance. Additionally, for discussion purposes, the method 300 is described with reference to FIG. 1.

At 310 of FIG. 3, the systems verifier 164 responds to a triggering event. Examples of a triggering event includes (by way of example and not limitation) receiving a manual verification request, performance of action by another program (e.g., installing software), and a schedule time event. This triggering event may be identifiable and associated with a particular type of desired verification.

At 312, the system verifier 164 examines the manifests of the self-describing artifacts to gather information from those manifests.

At 314, the verifier performs a verification of the online and active system of the computer 102. More particularly, it is a verification of the self-describing artifacts. As it is possible, these verifications may be performed on an offline "system image" as well.

The verifications performed by the verifier are designed to promote the stability, integrity, robustness of the system in its fully functioning condition. The following are a list of example verifications that the may be performed by the system verifier 164 (list provided by way of example not limitation):

- verifying that that all dependencies of installed software in the computer 102 are met;
- verifying that an operating system of the computer 102 includes all device drivers necessary to run on the hardware configuration of the computer 102;
- verifying that code in the computer 102 has not been altered either accidentally or maliciously;
- verifying that an application is correctly installed in the computer 102;
- verifying that a known faulty or malicious program is not installed on the computer 102;
- verifying that an application and all of its constituent components and dependencies exist on the computer 102 before installation;
- verifying that an application is installable on the computer 102 before loading its components onto a system;
- verifying that installation of a new application or system component will not conflict with existing applications or components;
- verifying that an application or operating system component can be removed without breaking dependencies from other applications or components;

verifying that an application or operating system conforms to a predefined local policy.

At 316, the verifier reports the results of the verification to whatever called it (e.g., the OS 112 and/or the user).

System Inspection

This new architecture overcomes many of the inadequacies of conventional software-based computers. For example, given an arbitrary offline "system image" of a software-based computer using the new architecture, one can, indeed, determine conclusively that the image contains a functional OS or a specific functional application. This cannot be done with a software-based computer using a conventional architecture.

The manifest of each artifact is stored within (or can be retrieved along with) a persistent "system image" of a software-based computer's content and configurations. The artifacts are stored in such a manner that their associated metadata (of their manifests) can be inspected (by, for example, the system inspector 180) when the image is offline. In addition, other contents of the image may be inspected as well.

In doing so, the system inspector 180 may make strong statements about the contents and the future behavior of the system. This is possible even if the metadata and other parts of the system image are scattered across a distributed store, such that they come together only when the system boots and runs. By examining the static manifests of the self-describing artifacts and proposed or anticipated dynamic manifests of associated prototypes and abstractions, the system inspector 180 can verify a number of properties of the software-based computer 102.

For example, the inspector can verify the classes of properties supporting compositional verification. In other words, the inspector can determine whether all of the necessary elements of a component of the software-based computer 102 exist on its persisted system image and that the elements compose correctly.

A property is compositionally verifiable if components can be verified for the property individually, and when composed, the system can be known to maintain the same property without re-verifying the all of the components. For example, in programming systems type safety is considered compositionally verifiable if individual load modules can be verified as type safe and when legally combined they maintain type safety. In this case, the system inspector 180 can verify that each load is type safe and then verify that the load modules are combined in a legal manner without requiring complex verification across the entire system whenever a new load module is added.

Methodological Implementation of Exemplary System Inspection

Figure 4:
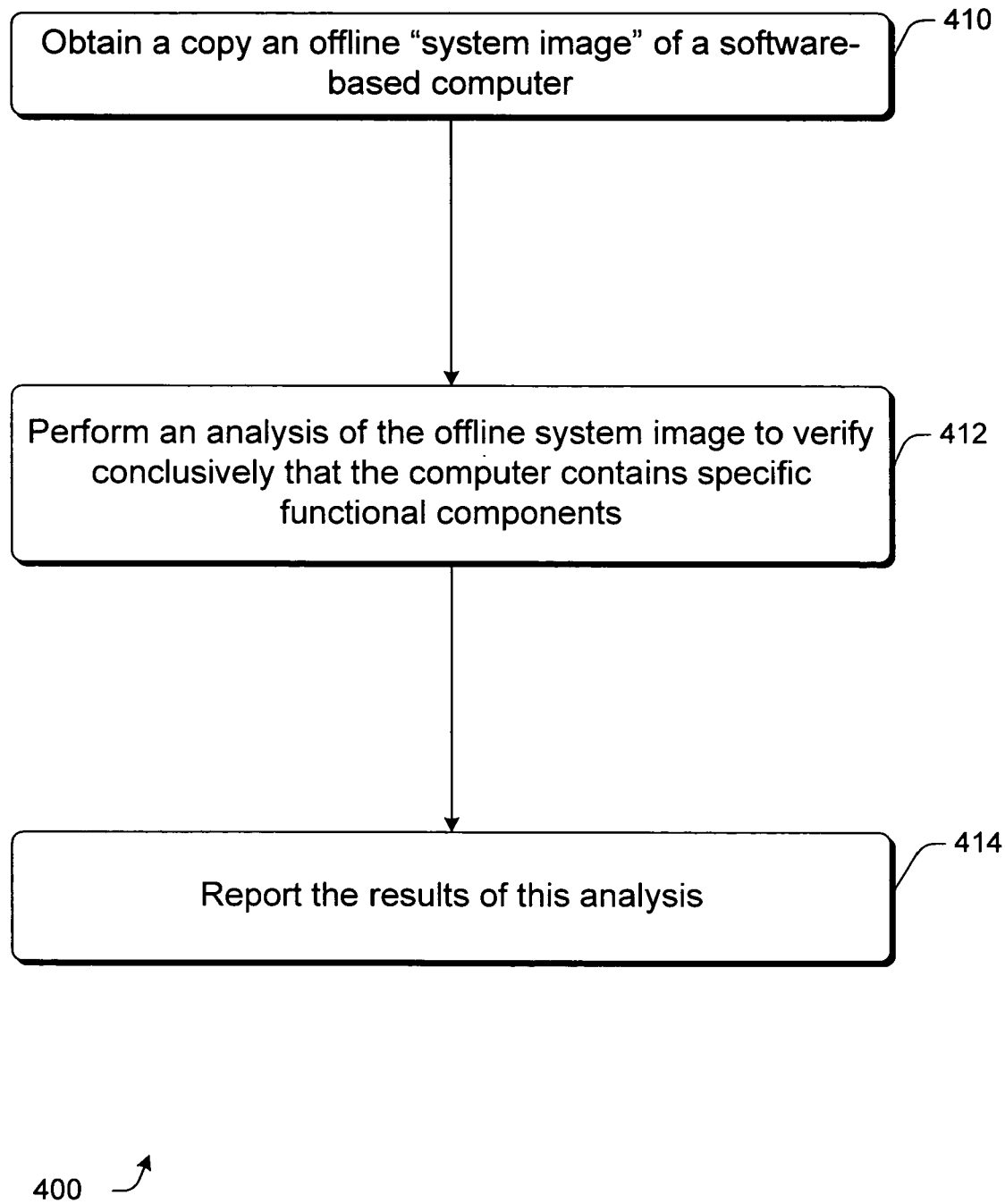
FIG. 4 shows a flow diagram showing a methodological implementation described herein to inspect an offline "system image" composed of, at least in part, of the persisted self-describing artifacts.

FIG. 4 shows a method 400 performed by the system inspector 180. This methodological implementation may be performed in software, hardware, or a combination thereof. For ease of understanding, the method is delineated as separate steps represented as independent blocks in FIG. 4; however, these separately delineated steps should not be construed as necessarily order dependent in their performance. Additionally, for discussion purposes, the method 400 is described with reference to FIG. 1.

At 410 of FIG. 4, the system inspector 180 obtains a copy of an offline "system image" of a software-based computer, such as the computer 102. This action is illustrated in FIG. 1 by the large-headed arrow.

At 412, the system inspector 180 performs an analysis of the offline system image to verify conclusively that the computer 102 contains specific functional components (such as the OS or applications). More particularly, the inspector examines the self-describing artifacts to see if all of the necessary components (described as such and referenced by manifests of the self-describing artifacts) are located and properly identified.

At 414, the inspector reports the results of this analysis.

Abstractions

Operating systems provide abstractions to frame computation and allow programmers to create software more easily by focusing more completely on their domain of expertise. An abstraction denotes a model of one or more components that represents the essential characteristics of those components that distinguish them from all other kinds of components and thus provides crisply defined conceptual boundaries.

Examples of existing operating system abstractions include file system abstractions to control and manage storage, I/O abstractions to control I/O devices, Graphical User Interface (GUI) abstractions, process abstractions to hold computation, and interprocess communication (IPC) abstractions to enable communication between processes.

Without these basic abstractions, programmers would be forced to devise their own ad hoc methods for performing common tasks. Invariably such diverse ad hoc methods lead to reduced programmer productivity, large scale duplication of effort, and increased system errors.

In, at least, one implementation, the exemplary self-describing artifact architecture creates new operating system abstractions, which include:

a system prototype, which represents a "runnable" (e.g., executable on the computer 102) software system including operating system and programs;

a system abstraction, which represents an active or "running" system including the operating system and programs;

an application prototype, which represents a runnable application program;

an application abstraction, which represents an instance of an active or "running" program; and a process prototype, which represents a runnable process.

Figure 5:
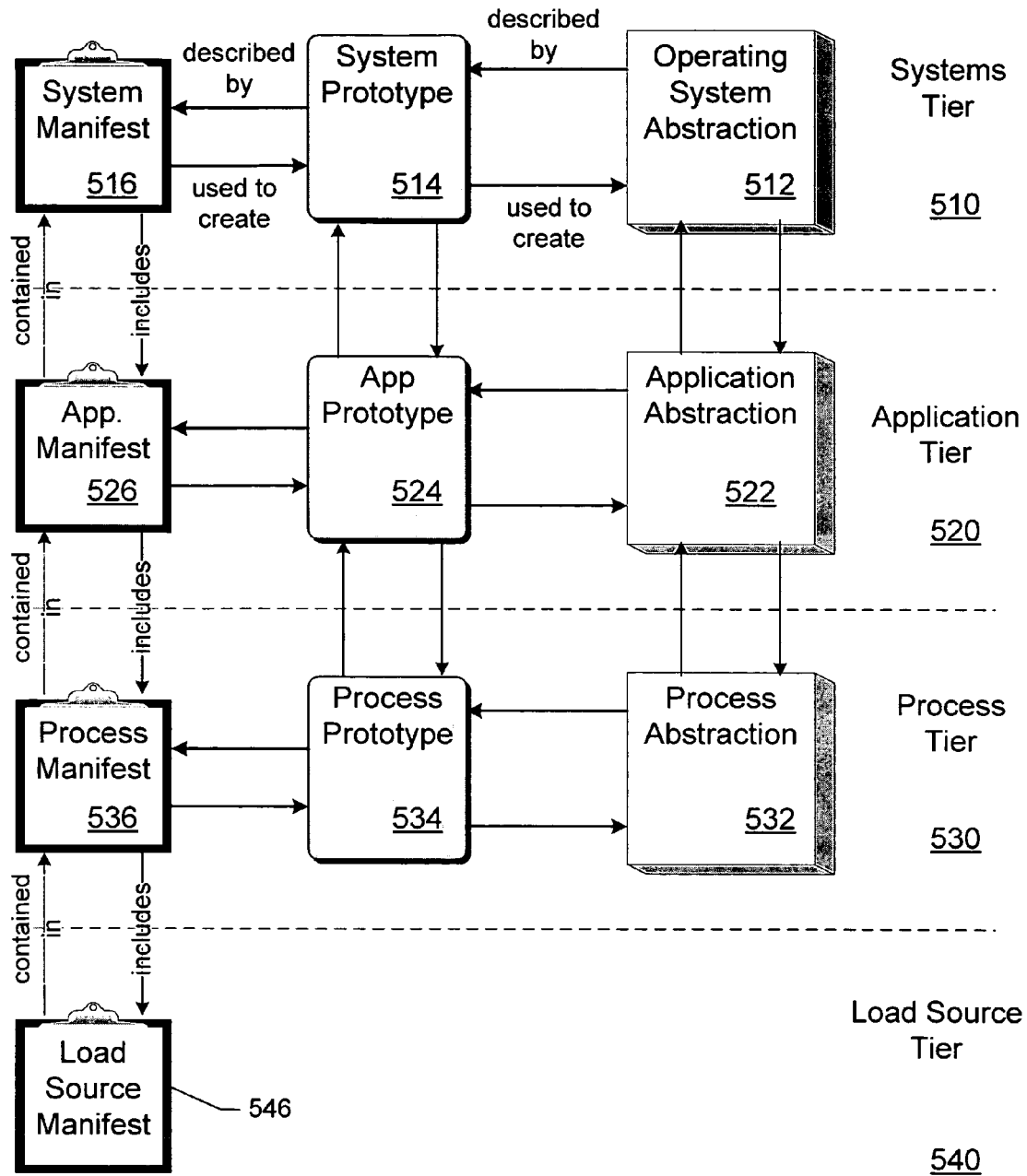
FIG. 5 is a diagram showing an example inter-relationship structure amongst software components (e.g., load modules, processes, applications, and operating system components), the example structure being in accordance with an implementation described herein.

FIG. 5 shows an example structure 500 of a software-based computer capable of implementing this new architecture. This includes the new abstractions and prototypes introduced by this new architecture in the context of conventional abstractions and prototypes. From top to bottom of FIG. 5, the four tiers in this example structure 500 are:

1. Systems tier 510, which includes:

an system abstraction 512 (which includes the operating system components (e.g., scheduler, IPC manager, I/O manager, security manager, garbage-collection and memory manager, etc.), and any other systems level components) and by inclusion all applications;

systems prototypes 514 associated with at least one system;

systems manifests 516 associated with at least one system including the OS and applications.

2. Application tier 520, which includes:

One or more application abstractions 522;

application prototypes 524 associated with at least one of the application abstractions;

application manifests 526 associated with at least one application-based artifact.

3. Process tier 530, which includes:

One or more process abstractions 532;

Process prototypes 534 associated with at least one of the process abstractions;

process manifests 536 associated with at least one process-based artifact.

4. Load source tier 540, which includes load source manifests 546 associated with at least one load-source artifact (e.g., load module).

For completeness, the system model may also include a system abstraction representing the entire running software system. In practice, the operating system 512 itself typically acts as the system abstraction.

Manifests are declarative description a software component (e.g., process, application, or OS element). When the manifests and the software components are persisted in association with each other, then the components are self-describing artifact.

The manifest is used to create a prototype. The act of installing a manifest and its described artifacts into a system creates a prototype. A prototype is a "runable" or "executable" manifestation of a software component. The prototype is used to create an instance or an abstraction of a software component. An instance or abstraction is a "running" or "executing" manifestation of a prototype.

In the example structure 500, the right-to-left arrows are to be read as "is described by." So, for example, the top tier 510 may read this way: OS abstraction 512 "is described by" its system prototype 514, which "is described by" its system manifest 516.

In this structure, the left-to-right arrows are to be read as "is used to create." So, for example, the second tier 520 may read this way: Application manifest 526 "is used to create" its application prototype 524, which "is used to create" its application abstraction 516.

Similarly, the members of each tier have a defined relationship between members in other tiers. Each member of a progressively higher tier references or includes the like members of lower tiers.

In the example structure 500, the top-to-bottom arrows are to be read as "includes or "supervises." So, for example, the system manifest 516 "includes" the application manifest 526, which "includes" the process manifest 536, which "includes" the load-source manifest 546.

In this structure, the bottom-to-top arrows are to be read as "contained in" or "is supervised by." So, for example, the process prototype 534 "is supervised by" the application prototype 524, which "is supervised by" the systems prototype 514.

In alternative implementations, the exemplary self-describing artifact architecture has a different number of tiers, different arrangements of tiers, and/or different abstractions.

The systems manifest 516 describes the entire system (i.e., all of the artifacts). It is a top-level manifest pointing to manifests for each operating system component and each application. Depending on scope, individual operating system components are described with application, process, or load source manifests.

The application manifest 526 contains the process manifest 536. As such, the application manifest describes or specifies the processes that are created when the application (represented by application abstraction 522) runs. Application manifests may also identify the interprocess communication interfaces exposed or required by the application and describe the bindings between interprocess communication interfaces of processes within the application.

The process manifest 526 contains load module manifests describing or specifying the load modules included in the process (represented by the process abstraction 532). Process manifests may identify the interprocess communication interfaces exposed or required by each process and describe the bindings between code and data interfaces on load modules.

The load source manifest 536 describes or specifies the persisted binary file containing the executable code of the load module and identifies any further load modules required by this load module. Load source manifests identify the code and data interfaces exposed or required by the load module.

An embodiment may support several types of manifests including manifests for running processes and for process prototypes, manifests for running applications and for application prototypes, manifests for running operating system components and for their prototypes, manifests for hardware devices, and one or more manifests for the system as a whole. In such an embodiment, the differing manifests may share and reuse the same structural elements.

Application Abstraction

Rather then just being part of a user-centric model, the concept of an application program is actually part of this the exemplary self-describing artifact architecture 100. In particular, the OS 112 (or portions thereof) inherently recognize the concept of an "application abstraction." As described by its associated manifest, an application abstraction is descriptively and necessarily linked to specific low-level abstractions (such as active processes and their load sources) and specific high-level abstractions (such as the operating system).

When a user, either directly or indirectly, runs a program, the OS 112 creates an instance of an application abstraction (such as application abstraction 522) from an application prototype (such as application prototype 524). Creating an instance of an application includes creating new instances of processes described by their process prototypes.

The static description of the application is embodied in one or more application manifests (such as application manifest 526). The OS 112 maintains "dynamic" metadata that links processes with applications, processes with process prototypes, and applications with application prototypes. The OS 112 also maintains additional dynamic metadata that links process prototypes and application prototypes with their respective manifests.

The application abstraction is embodied in a dynamic object. Other software components (such as part of the OS) can communicate with the dynamic application abstraction objects to determine which applications are running, to determine which processes belong to an application, and to retrieve other metadata, such as manifests, that are also available. For example, given the identity of a process, a program can ask the OS for the identity of the application to which it belongs; given the identity of an application, a program can ask the operating system for the identity of its application prototype; etc.

Methodological Implementation of Exemplary Application Abstraction Management

Figure 6:
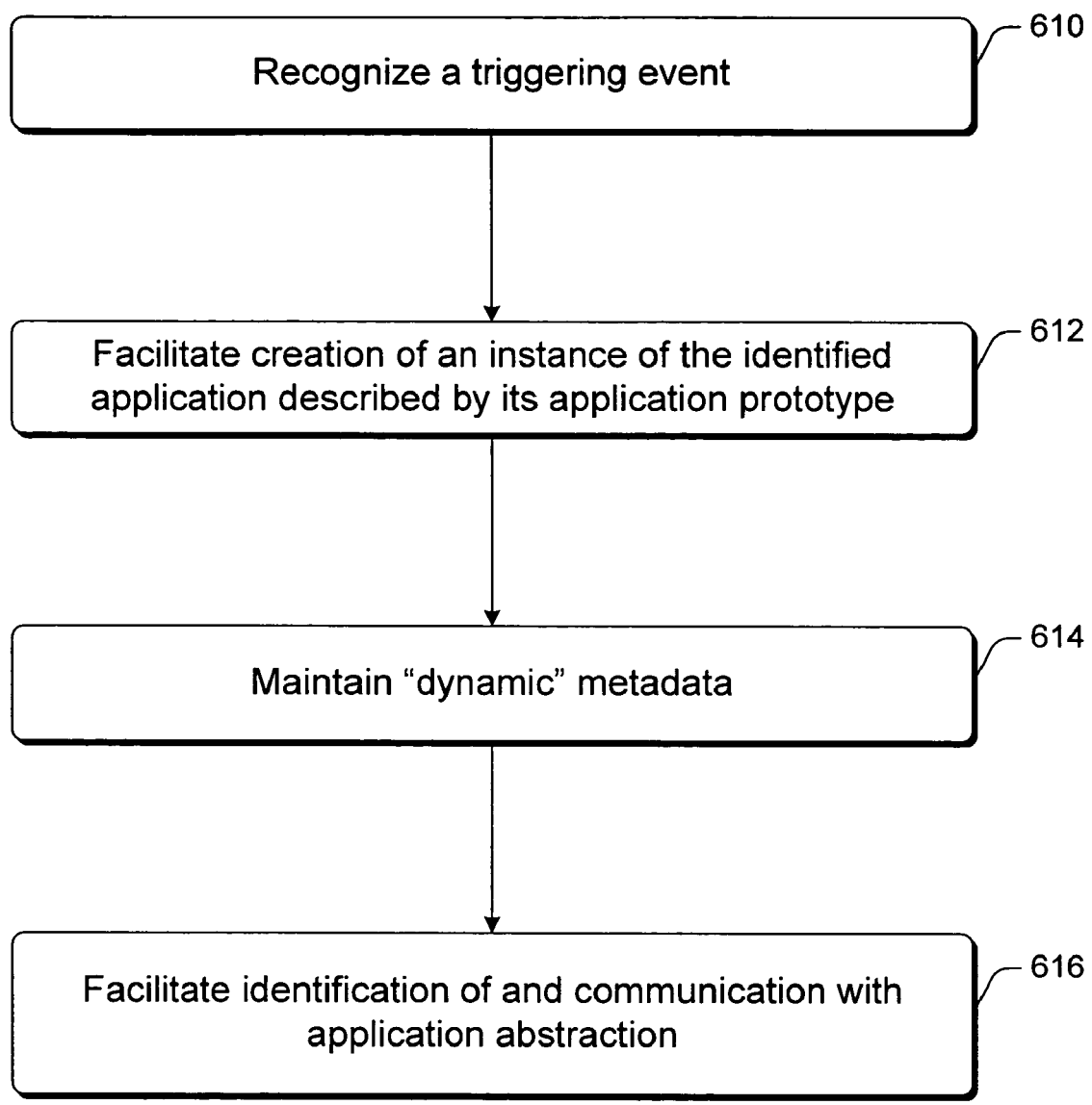
FIG. 6 shows a flow diagram showing a methodological implementation described herein to create and manage application abstractions.

FIG. 6 shows a method 600 performed by the OS 112 or portions thereof for the purpose of creating and managing application abstractions. This methodological implementation may be performed in software, hardware, or a combination thereof. For ease of understanding, the method is delineated as separate steps represented as independent blocks in FIG. 6; however, these separately delineated steps should not be construed as necessarily order dependent in their performance. Additionally, for discussion purposes, the method 600 is described with reference to FIG. 1.

At 610 of FIG. 6, the OS 112 recognizes a triggering event. Examples of a triggering event include (by way of example and not limitation) receiving a manual program invocation request from a user, receiving an invocation request from another program, and a scheduled time event for program invocation. This triggering event typically identifies the application to be invoked.

At 612, the OS 112 creates an instance of the identified application described by its application prototype. This instance is called an "application abstraction." As illustrated by example structure 500 of FIG. 5, creating the application abstraction includes creating new instances of associated processes described by their process prototypes.

At 614, the OS maintains "dynamic" metadata that links associated processes with the identified application abstraction, processes with process prototypes, and applications with application prototypes.

At 616, the OS facilitates identification of and communication with application abstraction by other software components.

Exemplary Computing System and Environment

Figure 7:
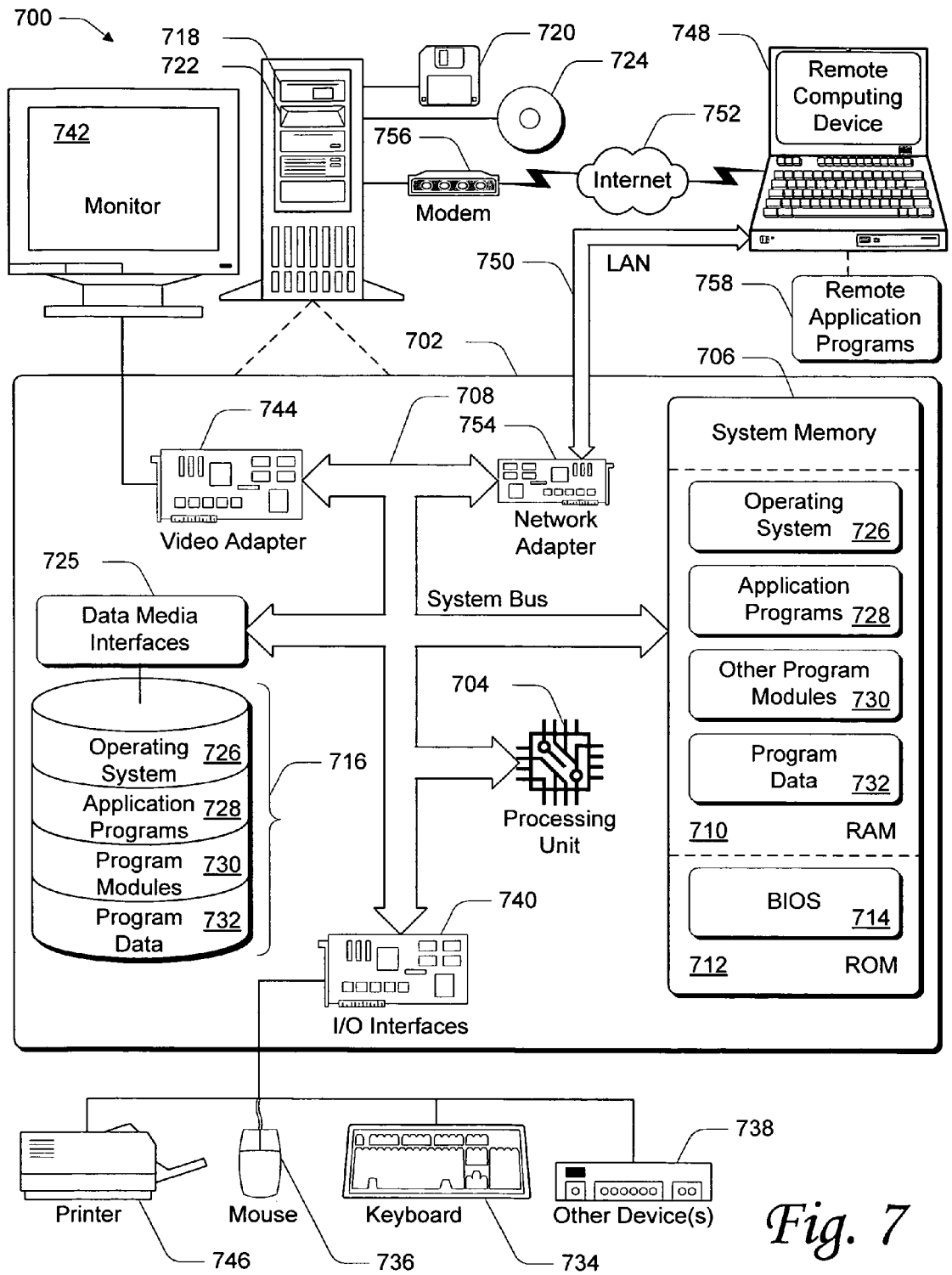
FIG. 7 is an example of a computing operating environment capable of (wholly or partially) implementing at least one embodiment described herein.

FIG. 7 illustrates an example of a suitable computing environment 700 within which an exemplary self-describing artifact architecture, as described herein, may be implemented (either fully or partially). The computing environment 700 may be utilized in the computer and network architectures described herein.

The exemplary computing environment 700 is only one example of a computing environment and is not intended to suggest any limitation as to the scope of use or functionality of the computer and network architectures. Neither should the computing environment 700 be interpreted as having any dependency or requirement relating to any one or combination of components illustrated in the exemplary computing environment 700.

The exemplary self-describing artifact architecture may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary self-describing artifact architecture may be described in the general context of processor-executable instructions, such as program modules, being executed by a computer. Generally, program modules include routines, programs, objects, components, data structures, etc. that perform particular tasks or implement particular abstract data types. The exemplary self-describing artifact architecture may also be practiced in distributed computing environments where tasks are performed by remote processing devices that are linked through a communications network. In a distributed computing environment, program modules may be located in both local and remote computer storage media including memory storage devices.

The computing environment 700 includes a general-purpose computing device in the form of a computer 702. The components of computer 702 may include, but are not limited to, one or more processors or processing units 704, a system memory 706, and a system bus 708 that couples various system components, including the processor 704, to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 702 typically includes a variety of processor-readable media. Such media may be any available media that is accessible by computer 702 and includes both volatile and non-volatile media, removable and non-removable media.

The system memory 706 includes processor-readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 725. Alternatively, the hard disk drive 716, magnetic disk drive 718, and optical disk drive 722 may be connected to the system bus 708 by one or more interfaces (not shown).

The disk drives and their associated processor-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of processor-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 716 magnetic disk 720, optical disk 724, ROM 712, and/or RAM 710, including, by way of example, an operating system 726, one or more application programs 728, other program modules 730, and program data 732.

A user may enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device may also be connected to the system bus 708 via an interface, such as a video adapter 744. In addition to the monitor 742, other output peripheral devices may include components, such as speakers (not shown) and a printer 746, which may be connected to computer 702 via the input/output interfaces 740.

Computer 702 may operate in a networked environment using logical connections to one or more remote computers, such as a remote computing device 748. By way of example, the remote computing device 748 may be a personal computer, a portable computer, a server, a router, a network computer, a peer device or other common network node, and the like. The remote computing device 748 is illustrated as a portable computer that may include many or all of the elements and features described herein, relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet. Such networking environments may be wired or wireless.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which may be internal or external to computer 702, may be connected to the system bus 708 via the input/output interfaces 740 or other appropriate mechanisms. It is to be appreciated that the illustrated network connections are exemplary and that other means of establishing communication link(s) between the computers 702 and 748 may be employed.

In a networked environment, such as that illustrated with computing environment 700, program modules depicted, relative to the computer 702 or portions thereof, may be stored in a remote memory storage device. By way of example, remote application programs 758 reside on a memory device of remote computer 748. For purposes of illustration, application programs and other executable program components, such as the operating system, are illustrated herein as discrete blocks, although it is recognized that such programs and components reside at various times in different storage components of the computing device 702, and are executed by the data processor(s) of the computer.

Processor-Executable Instructions

An implementation of an exemplary self-describing artifact architecture may be described in the general context of processor-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 7 illustrates an example of a suitable operating environment 700 in which an exemplary self-describing artifact architecture may be implemented. Specifically, the exemplary self-describing artifact architecture(s) described herein may be implemented (wholly or in part) by any program modules 728-730 and/or operating system 726 in FIG. 7 or a portion thereof.

The operating environment is only an example of a suitable operating environment and is not intended to suggest any limitation as to the scope or use of functionality of the exemplary self-describing artifact architecture(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Processor-Readable Media

An implementation of an exemplary self-describing artifact architecture may be stored on or transmitted across some form of processor-readable media. Processor-readable media may be any available media that may be accessed by a computer. By way of example, processor-readable media may comprise, but is not limited to, "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies processor-readable instructions, data structures, program modules, or other data in a modulated data signal, such as carrier wave or other transport mechanism. Communication media also includes any information delivery media.

CONCLUSION

The techniques, described herein, may be implemented in many ways, including (but not limited to) program modules, general- and special-purpose computing systems, network servers and equipment, dedicated electronics and hardware, and as part of one or more computer networks. The techniques, described herein, may be implemented, for example, on a computer system depicted in FIG. 7. More particularly, these techniques may be implemented, for example, by an operating system on a computer system depicted in FIG. 7.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computing system comprising:
    a processor configured to execute processor-executable instructions; a memory coupled to the processor; and a storage sub-system coupled to the processor and configured to persistently save multiple self-describing software artifacts, wherein each software artifact comprises an offline manifestation of an executable entity, wherein each executable entity is one of: a process, an application, or a component of an operating system, the artifacts being representative of software components of the computing system:

wherein each of the multiple self-describing software artifacts has an associated persistently saved manifest:

wherein each manifest comprises a metadata declarative description of the manifest's software artifact:

wherein each manifest comprises a metadata declarative description of the associated executable entity, in the event that multiple manifestations of a particular executable entity exist, a separate manifest is associated with each manifestation of the particular executable entity;

wherein each manifest exists in one of two forms:

in an event that manifests are of a static manifest form the static manifests are stored in association with software artifacts; and in an event that manifests are of a dynamic manifest format the dynamic manifests are employed during runtime of each of their associated executable entities, such that the dynamic manifests include static metadata which is available at runtime and dynamic metadata which is constructed at runtime to connect a plurality of runtime system elements.

2. A system as recited in claim 1, wherein each of the multiple self-describing software artifacts has an associated persistently saved manifest comprising primarily declarative descriptions of the manifest's software artifact.

3. A system as recited in claim 1, wherein each of the multiple self-describing software artifacts has all associated persistently saved manifest comprising completely declarative descriptions of the manifest's software artifact.

4. A system as recited in claim 1, wherein the software components of the computing system comprise operating system elements and applications.

5. A system as recited in claim 1, wherein the software components of the computing system comprise operating system elements and applications, the elements and applications being installed on the computing system and configured for execution on the processor.

6. A system as recited in claim 1, wherein a persistently saved system manifest comprises declarative descriptions of the multiple self-describing software artifacts.

7. A system as recited in claim 1 further comprising an artifact manager configured to manage the self-describing software artifacts.

8. A system as recited in claim 1 further comprising an artifact manager configured to update the self-describing software artifacts.

9. A system as recited in claim 1 further comprising an artifact manager configured to optimize use of self-describing software artifacts for generating a set of processor-executable instructions.

10. A system as recited in claim 1 further comprising an execution gateway configured to allow execution of only processor-executable instructions associated with a self-describing artifact only if conditions for allowed execution described by the associated self-describing artifact exist.

11. A system as recited in claim 1 further comprising an execution gateway configured to limit execution of functional components of the self-describing software artifacts when a manifest associated with the functional components of the self-describing software artifacts includes a conditional declarative description that the execution gateway determines is met.

12. A system as recited in claim 1 further comprising an execution gateway configured to audit a self-describing artifact to determine if the artifact differs from the artifact's own self-description.

13. A system as recited in claim 1 further comprising a system verifier configured to perform acts comprising:
examining the self-describing artifacts to gather information about the artifacts;
performing a verification of the self-describing artifacts; reporting results of the verification.

14. A system as recited in claim 1 further comprising an operating system configured to perform acts comprising facilitating creation of an instance of an application, wherein the source components of the application are derived from one or more of the self-describing artifacts.

15. A system as recited in claim 1 further comprising an optimization tool configured to perform acts comprising:
examining the self-describing artifacts to gather information about the artifacts;
optimizing the components of self-describing artifacts; persistently saving the self-describing artifacts with optimized components.

16. A system as recited in claim 1 further comprising an error detection tool configured to perform acts comprising:
examining the self-describing artifacts to gather information about the artifacts;
analyzing the self-describing artifacts to detect potential errors; reporting results of the analysis.

17. One or more computer storage media having processor-executable instructions thereon that, when executed by a processor, performs acts comprising:
facilitating persistent saving of multiple self-describing software artifacts on a computing system,
wherein each software artifact comprises an offline manifestation of an executable entity and is representative of functional operating system components or functional applications, such components and applications being installed on the computing system;
facilitating persistent saving of multiple manifests respectively associated with the multiple self-describing software artifacts, wherein in an event that multiple manifestations of a particular executable entity exist, a separate manifest is associated with each manifestation of the particular executable entity, the manifests comprising metadata declarative descriptions of:
the multiple self-describing software artifacts and an associated executable entity wherein each manifest exists in either a static manifest form or a dynamic manifest form such that:
in an event that a manifest is of the static manifest form storing the static manifest in association with a self-describing software artifact: and
in an event that a manifest is of the dynamic manifest form employing the dynamic manifest during runtime of an associated executable entity, such that the dynamic manifest comprises dynamic metadata which is constructed at runtime to connect a plurality of runtime system elements.

18. One or more media as recited in claim 17 further comprising examining the manifests to discover information about the multiple self-describing software artifacts.

19. One or more computer storage media having processor-executable instructions that, when executed by a processor, perform acts comprising:
examining multiple self-describing software artifacts and manifests associated with the multiple self-describing software artifacts persistently saved on a computing system to gather information about the self-describing software artifacts and the manifests wherein:

each software artifact comprises an offline manifestation of an executable entity; each executable entity is one of: a process, an application, or a component of an operating system, the manifests comprise metadata declarative descriptions of the multiple self-describing software artifacts and associated executable entities:

in an event that multiple manifestations of a particular executable entity exist, a separate manifest is associated with each manifestation of the particular executable entity;

each manifest exists in either a static manifest form or a dynamic manifest form such that:

a manifest in the static manifest form is stored in association with a software artifact: and a manifest in the dynamic manifest form is employed during runtime of each associated executable entity, such that the manifest in the dynamic manifest form comprises dynamic metadata which is constructed at runtime to connect a plurality of runtime system elements; and;

performing verification on the multiple self-describing software artifacts; and reporting results of the verification.

20. One or more media as recited in claim 19, wherein the acts further comprise verifying that dependencies of software components installed on a computer are met, the software components being composed of one or more self-describing software artifacts.

21. One or more media as recited in claim 19, wherein the acts further comprise performing act comprises-verifying that processor-executable instructions represented by one or more self-describing artifacts remains unaltered.

22. One or more media as recited in claim 19, wherein the acts further comprise verifying that an application
is correctly installed in a computer, the application being composed of one or more self-describing software artifacts.

23. One or more media as recited in claim 19, wherein the acts further comprise verifying that a known faulty or malicious program is not installed on a computer.

24. One or more media as recited in claim 19, wherein the-acts further comprise verifying that an application and all of its constituent components and dependencies are accessible from a computer before the application is installed on the computer, the application being composed of one or more self-describing software artifacts.

25. One or more media as recited in claim 19, wherein the acts further comprise verifying that an application is installable on the computer before loading components of the application onto the computer.

26. One or more media as recited in claim 19, wherein the acts further comprise verifying that installation of a new application will not conflict with existing applications, the applications being composed of one or more self-describing software artifacts.

27. One or more media as recited in claim 19, wherein the acts further comprise verifying that an application can be removed without breaking dependencies from other applications, the applications being composed of one or more self-describing software artifacts.

28. One or more media as recited in claim 19, wherein the acts further comprise verifying that an application conforms to a predefined local policy, the application being composed of one or more self-describing software artifacts.

29. One or more media as recited in claim 19, wherein one or more self-describing artifacts compose an application, has-having process-executable instructions that may be executed on a computer when the application is loaded into a memory of a computer, the acts further comprising optimizing the process-executable instructions of the application to improve the performance of the instructions of the application.

30. One or more media as recited in claim 19, wherein one or more self-describing artifacts compose an application, having process-executable instructions that may be executed on a computer when the application is loaded into a memory of a computer, the acts further comprising analyzing the process-executable instructions of the application to detect potential errors in execution behavior or operation of the instructions of the application.

31. A data structure embodied on one or more computer storage media, the data structure comprising:

multiple self-describing software artifacts comprising an offline manifestation of an executable entity and processor-executable instructions representing operating system components or applications, such components and applications being installed on a computing system;

manifests associated with the multiple self-describing software artifacts, the manifests being comprising metadata declarative descriptions of the multiple self-describing software artifacts and metadata declarative descriptions of associated executable entities, wherein in an event that multiple manifestations of a particular executable entity exist, a separate manifest is associated with each manifestation of the particular executable entity, and each manifest exists in one of a plurality of forms, the plurality of forms comprising:

a static manifest form stored in association with software artifacts and a dynamic manifest form employed during runtime of each associated executable entity, such that the dynamic manifests comprise dynamic metadata which is constructed at runtime to collect a plurality of runtime system elements.

32. One or more media as recited in claim 31, wherein one of the manifests is a system manifest comprising declarative descriptions of the multiple self-describing software artifacts.

33. One or more computer storage media having processor-executable instructions that, when executed by a processor, perform acts comprising:

obtaining a copy of an offline "system image" of a software-based computer, the system image representing the content and configuration of software components installed on the computer, wherein the installed software components are represented on the system image as self-describing software artifacts wherein each software artifact comprises an offline manifestation of an executable entity, each executable entity is one of: a process, an application, or a component of an operating system.

and each self-describing software artifact has an associated persistently saved manifest comprising a metadata declarative description of the manifest's software artifact and a metadata declarative description of an associated executable entity, such that in an event that multiple manifestations of a particular executable entity exist, a separate manifest is associated with each manifestation of the particular executable entity: and each manifest exists in either a static manifest form or a dynamic manifest form;

in an event that a first manifest exists in the static manifest form, storage the first manifest in association with software artifacts; and, in an event that a second manifest exists in the dynamic manifest form, employing the second manifest during runtime of each associated executable entities, such that the second manifest comprises dynamic metadata which is constructed at runtime to collect a plurality of runtime system elements;

analyzing the self-describing software artifacts of the offline system image; reporting results of the analyzing act.

34. One or more computer storage media as recited in claim 33 further comprising identifying, based upon the analyzing act, the software components in the offline system image.

35. One or more computer storage media as recited in claim 33 further comprising:
identifying based upon the analyzing act, the software components in the offline system image;
determining whether the identified software components in the offline system image are functional.

36. One or more computer storage media as recited in claim 33 further comprising:
identifying based upon the analyzing act, the software components in the offline system image;
determining whether the identified software components in the offline system image contain defects.

37. One or more computer storage media as recited in claim 33, wherein each of the self-describing software artifacts has an associated persistently saved manifest comprising declarative descriptions of the manifest's software artifact.

38. One or more computer storage media as recited in claim 33, wherein each of the self-describing software artifacts has an associated persistently saved manifest comprising primarily declarative descriptions of the manifest's software artifact.

39. One or more computer storage media as recited in claim 33, wherein each of the self-describing software artifacts has an associated persistently saved manifest comprising completely declarative descriptions of the manifest's software artifact.

40. One or more computer storage media as recited in claim 33, wherein the software components of the computing system comprise operating system elements and applications.

41. One or more computer storage media as recited in claim 33, wherein the offline system image comprises a persistently saved system manifest having declarative descriptions of the self-describing software artifacts.

* * * * *